2,607,390

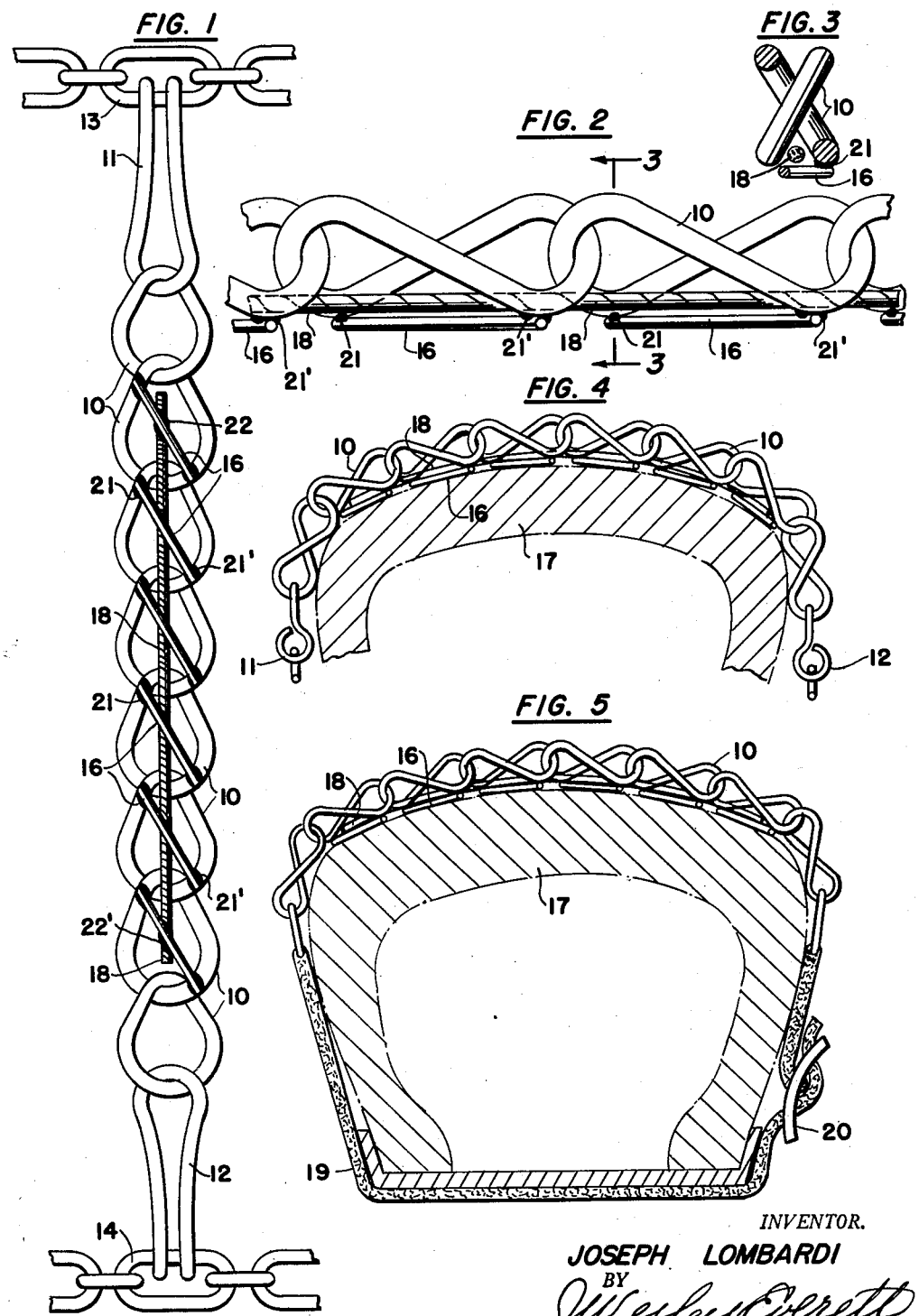
Aug. 19, 1952 — J. LOMBARDI — 2,607,390
ANTISKID DEVICE
Filed May 25, 1948
INVENTOR.
JOSEPH LOMBARDI
BY
J. Wesley Everett Patented Aug. 19, 1952

UNITED STATES PATENT OFFICE 2,607,390

ANTISKID DEVICE

Joseph Lombardi, Glen Burnie, Md.

Application May 25, 1948, Serial No. 29,179

3 Claims. (Cl. 152—231)

The present invention relates in general to anti-skid devices and more particularly to the special construction of the gripping members.

The most popular of these gripping members is a chain made up of a half twist interlocking link. Through the years these have seemed to give the best results, both from the standpoint of manufacture and performance. However, these chains are subject to constant wear and after such wearing break very quickly, particularly that portion directly under the tread of the wheel, and it is with this idea in mind that the present invention has been developed.

When these chain gripping members break, it usually happens somewhere near the center of the chain, as this is the portion receiving the most weight from the tread of the wheel, or tire. This, of course, is only true when the skid chains are applied to a single wheel. In dual wheels, the chain may break over either one of the wheel treads. Regardless of where the chain breaks, the ends of the broken chain are thrown outwardly by centrifugal force radially of the hub of the wheel when the wheel is rotated. As the space between the wheel rims and the fenders of most vehicles is quite close, the ends of the broken chain will hit the fenders, or body, of the vehicle causing considerable damage to the vehicle if allowed to continue for any length of time. Likewise, if several of these cross chains become broken, it is likely that the whole skid chain will be lost.

The primary object of the present invention is to provide a cross-chain for an anti-skid device having incorporated therewith means for preventing the chain from overextending should it become broken.

Another object of the invention is to provide the chain link members with means for carrying and supporting the chain holding means.

These and other objects of the invention will be more apparent from the detail description and the accompanying drawings forming a part of this specification in which:

Figure 1 is a bottom plan view of a cross chain and a fragmentation of one form of attaching means.

Figure 2 is an enlarged fragmentary view of a portion of the improved cross chain.

Figure 3 is a sectional view taken along the line 3—3 of Figure 2.

Figure 4 is a side view of the chain.

Figure 5 shows a modified form of attaching means.

In all of the above described views, like reference characters designate corresponding parts throughout the similar views.

The general character of the anti-skid device is to provide a cross-chain 10 having members 11 and 12 for securing the cross chain to the attaching means, which is shown in Figures 1 as side chains 13 and 14.

The invention per se is more particularly in the cross chain rather than in any combination with other elements. The individual link members of the cross chains are of the half twist type and are provided with a cross bar 16 welded across that portion of the link which will be next to the wheel rim, or tire 17. Woven within the links and bars is a flexible cable 18, the ends of which are secured by weldings 22 and 22', or other means adjacent the ends of the cross chains. The cable may be welded to each of the bars in each individual link if desirable. Further, it is not necessary to have this specific link structure as any type link that would carry and support the cable would suffice.

In Figure 4 the cross chain is shown as it would lie against a tire 17, the cross members 16 are placed next to the tire and the cable extends along over the tread of the tire between the bars 16 and the links proper.

In Figure 5 there is shown a modified form of attaching means. Instead of the regular side chains 13 and 14, the cross chain is held in location by a strap member 19 and a buckle 20. These are usually known as emergency chains.

A cross chain of this construction has a very definite advantage over any of those now available. Each of the link members is individually supported upon the cable, as is the cable supported by them. The cable may be of any length extending up to the full length of the cross chain. However, for efficient operation it should extend at least along that portion of the chain covering the tread of the tire, as the center links covering the treads of the tire are always the first to wear out.

These cross chains are subjected to a great deal of wear, particularly on stone and concrete highways, and that portion of the chain extending over the center of the tread receives the greatest wear and those links break and the ends of the chain tend to fly out and strike against the body and fenders of the vehicle causing damage to the vehicle and a very disagreeable noise. By having the cable positioned below the outer surface of the chain links where it will not be worn away by coming in contact with the road, it will tend to hold the ends of a broken chain against the tire tread and prevent the ends from flying outward and striking against the vehicle. It also keeps the cross chain in place over the tread where it will continue to act as an anti-skid element which will provide for maximum safety in vehicle operation. There is an additional feature in that should one or more of the cross chains become broken when there is no opportunity to immediately replace the broken chain, there is a possibility that the whole skid chain may be lost including either the side chains or the clamping attachment 19 shown in Figure 5.

It should be understood that various changes in the details of construction of the cross chain assembly may be resorted to without departing from the spirit of the invention. The proportions shown in the patent drawings, the number and form of the links and other arbitrary details are not limiting and only so far as the invention has been particularly pointed out in the accompanying claims is the same to be limited.

I claim:

1. An anti-skid device for vehicle wheel treads comprising annular supporting elements extending along and adjacent the rims and one on each side of the wheel, a plurality of cross-chain members extending over the tread and having their ends connected to the annular elements, each of the said cross-chain connecting members are being composed of a plurality of interconnected chain links, a single cable passing loosely through each of the links and in a line substantially parallel with the connecting cross-chain members, the said cable being positioned below the outer surface of the chain links extending over the tread and secured at each end to a single link member of the cross-chain adjacent the annular supporting element.

2. An anti-skid device for wheeled treaded vehicles comprising attaching means, a gripping member secured thereto and adapted to extend over the wheel tread, said gripping member consisting of a multiple interlocking link chain, a single cable carried freely through the links of the said chain below the outer surface of the chain links, the ends of the chain being secured to the cross-chain adjacent the ends of the latter.

3. An anti-skid device for a wheeled vehicle comprising attaching means, a plurality of gripping members secured thereto and adapted to extend over the wheel tread, said attaching means consisting of side chains extending annularly around the wheel adjacent the tread and on both sides of the said wheel, the said gripping members consisting of a cross-chain of interlocking link members, means at each end of the cross-chain for engaging the side chains, a single cable carried freely through the links of each cross-chain and below the outer surface of the link members, the ends of the cable being secured adjacent the ends of the said cross-chain.

JOSEPH LOMBARDI.

REFERENCES CITED

The following references are of record in the file of this patent:

UNITED STATES PATENTS

| Number | Name | Date |
|---|---|---|
| 1,639,205 | Whitaker | Aug. 16, 1927 |
| 1,644,077 | Nesbitt | Oct. 4, 1927 |
| 1,845,026 | Lewis | Feb. 16, 1932 |
| 1,953,495 | Nargi | Apr. 3, 1934 |
| 2,424,478 | Mason | July 22, 1947 |